(12) United States Patent
Cooper et al.

(10) Patent No.: US 6,991,524 B1
(45) Date of Patent: Jan. 31, 2006

(54) METHOD AND APPARATUS FOR RECONDITIONING DIGITAL DISCS

(75) Inventors: Ivan George Cooper, Chilliwack (CA); Mark Charles Chaplin, Surrey (CA)

(73) Assignee: Disc Go Technologies Inc., Langley (CA)

( * ) Notice: Subject to any disclaimer, the term of this patent is extended or adjusted under 35 U.S.C. 154(b) by 0 days.

(21) Appl. No.: 09/611,625

(22) Filed: Jul. 7, 2000

(51) Int. Cl.
 *B24B 1/00* (2006.01)

(52) U.S. Cl. .................. 451/58; 451/66; 451/388; 451/272

(58) Field of Classification Search ............ 451/65–68, 451/41, 57; 15/77, 102; 901/40; 414/627
See application file for complete search history.

(56) References Cited

U.S. PATENT DOCUMENTS

| | | | | |
|---|---|---|---|---|
| 4,299,533 A | * | 11/1981 | Ohnaka ................. 198/750.12 |
| 4,604,027 A | * | 8/1986 | Becker et al. ............... 414/749 |
| 5,000,651 A | * | 3/1991 | Akagawa et al. ............ 414/741 |
| 5,099,618 A | * | 3/1992 | Schmid ........................ 451/41 |
| 5,102,114 A | * | 4/1992 | Suda ........................... 271/18 |
| 5,102,290 A | * | 4/1992 | Cipolla ....................... 198/375 |
| 5,201,913 A | * | 4/1993 | Vliet .......................... 294/64.1 |
| 5,220,754 A | | 6/1993 | Tayebi et al. |
| 5,567,199 A | * | 10/1996 | Huber et al. ................... 451/41 |
| 5,593,343 A | * | 1/1997 | Bauer ........................ 451/254 |
| 5,674,115 A | * | 10/1997 | Yamashita et al. .......... 451/289 |
| 5,733,179 A | | 3/1998 | Bauer |
| 5,746,811 A | | 5/1998 | Smithlin |
| 5,816,895 A | * | 10/1998 | Honda ......................... 451/41 |
| 5,826,292 A | | 10/1998 | Ikemoto |
| 5,827,111 A | * | 10/1998 | Ball ............................ 451/41 |
| 5,900,618 A | | 5/1999 | Anlage et al. |
| 5,943,722 A | | 8/1999 | Hamilton et al. |
| 5,954,566 A | | 9/1999 | Bauer |
| 5,964,650 A | | 10/1999 | Born et al. |
| 5,984,619 A | * | 11/1999 | Allen et al. ............... 414/752.1 |
| 6,004,187 A | * | 12/1999 | Nyui et al. ..................... 451/5 |
| 6,086,797 A | | 7/2000 | Bango |
| 6,099,388 A | | 8/2000 | Fritsch et al. |
| 6,106,369 A | * | 8/2000 | Konishi et al. ............... 451/41 |
| 6,159,080 A | * | 12/2000 | Talieh ......................... 451/41 |
| 6,162,112 A | * | 12/2000 | Miyazaki et al. ............. 451/36 |
| 6,187,375 B1 | | 2/2001 | Alders et al. |
| 6,227,950 B1 | * | 5/2001 | Hempel et al. ............... 451/66 |
| 6,261,159 B1 | * | 7/2001 | Krieg et al. .................. 451/63 |
| 6,270,392 B1 | * | 8/2001 | Hayashi et al. ................ 451/5 |
| 6,277,309 B1 | | 8/2001 | Campbell |
| 6,322,430 B1 | * | 11/2001 | Kennedy et al. ............ 451/287 |
| 6,368,526 B1 | | 4/2002 | Bango |
| 6,386,946 B1 | | 5/2002 | Lin et al. |
| D467,949 S | | 12/2002 | Lee |

(Continued)

FOREIGN PATENT DOCUMENTS

DE 4340595 A1 6/1995

(Continued)

*Primary Examiner*—George Nguyen
(74) *Attorney, Agent, or Firm*—Stinson Morrison Hecker LLP

(57) ABSTRACT

Apparatus and method for reconditioning the protective coating of a digital disc. The damaged digital disc is automatically moved between workstations by a suction member which grasps the disc at the first workstation and releases the disc at the second workstation. Each of the workstations is defined by worktools which operate on the digital disc. A feed cartridge member stores the damaged discs prior to movement of the discs into the first workstation and a receiving cartridge member stores the reconditioned discs following the final reconditioning operations at the last workstation.

20 Claims, 4 Drawing Sheets

U.S. PATENT DOCUMENTS

| | | |
|---|---|---|
| 6,638,149 B2 | 10/2003 | Lalli et al. |
| 6,699,100 B1 | 3/2004 | Lee |
| 6,726,527 B2 | 4/2004 | Lalli et al. |
| 2002/0077038 A1 | 6/2002 | Stegner |
| 2002/0102919 A1 | 8/2002 | Lalli et al. |
| 2002/0187733 A1 | 12/2002 | Lalli et al. |
| 2003/0124962 A1 | 7/2003 | Lee |
| 2004/0063388 A1 | 4/2004 | Lalli et al. |
| 2004/0116056 A1 | 6/2004 | Hovsepian |

FOREIGN PATENT DOCUMENTS

| | | | |
|---|---|---|---|
| DE | 19827124 A | 12/1999 | |
| EP | 0570600 A1 | 11/1993 | |
| EP | 0865038 | 9/1998 | |
| EP | 0865038 A1 | 9/1998 | |
| EP | 1040900 A1 | 10/2000 | |
| JP | 2-23583 | 1/1990 | |
| JP | 211117 * | 9/1991 | .................. 414/749 |
| JP | 8-111079 | 4/1996 | |
| JP | 9-066449 | 3/1997 | |
| JP | 9-192992 | 7/1997 | |
| JP | 11-353857 | 12/1999 | |
| WO | WO 94/13435 | 6/1994 | |
| WO | WO 95/21890 | 1/1995 | |
| WO | WO 97/43763 | 11/1997 | |
| WO | WO 99/46080 | 9/1999 | |
| WO | WO 02/058884 | 8/2002 | |
| WO | WO 02/077995 | 10/2002 | |

* cited by examiner

METHOD AND APPARATUS FOR RECONDITIONING DIGITAL DISCS

INTRODUCTION

This invention relates to apparatus for reconditioning digital discs and, more particularly, to apparatus used for reconditioning damaged digital discs and to the method used for such reconditioning.

BACKGROUND OF THE INVENTION

Digital discs are pervasive in computer operations. They may take various configurations but DVD (digital video discs) and CD-ROM (compact discs-read only memory) are two of the more common. The construction of the discs comprises, typically, a layer of aluminum on which is deposited the digital data to be read and a plastic coating which overlays the data on the aluminum disc and provides some measure of protection for the data.

Digital discs may be and are frequently damaged. This is particularly the case where the discs are temporarily used such as in rental operations and the like where customers of such rental operations have no particular reason to take care of such discs during rental. This results in the discs being returned to the rental establishment in a damaged condition.

Compact discs are expensive to replace and since the data underlying the plastic overlay typically still retains its integrity, there is reason to restore the disc to its original condition or, at least, to a condition where the data can be properly read through the plastic layer. By so doing, the need for discarding the damaged disc and purchasing a further disc is obviated and money is saved.

Reconditioning the protective overlay coating in a digital disc is known. Such an apparatus and method is described and illustrated, for example, in U.S. Pat. Nos. 5,954,566 and 5,733,179, both to Bauer. These patents teach a technique for reconditioning a protective coating by using a buffing tool which buffs the damaged protective coating on the disc. The disc is mounted on a turntable which has a controllable rotation speed. The buffing tool is brought into contact with the protective coating and rotated by a motor. By rotating the buffing tool, the protective coating is reconditioned to allow optical reading of the data. However, manual manipulation of the disc is required before, during and after the buffing operation.

Canadian Patent 2,230,394 (Perego) teaches an automatic technique for producing optical discs. Work stations are located in two parallel advance lines. The disc being produced advances down one line and returns on the other line. However, there is no teaching of reconditioning digital discs.

Canadian patent application serial no. 2,169,609 teaches a method and apparatus for reconditioning compact discs. The technique, however, similar to the Bauer teachings, uses manual operation to refurbish the damaged coating of compact discs. The manual operation clearly puts limits on the number of discs that may be damaged and reconditioned and the efficiency of reconditioning large numbers of digital discs.

SUMMARY OF THE INVENTION

According to one aspect of the invention, there is provided apparatus for reconditioning a protective coating on a digital disc, said apparatus comprising at least one tool at a first workstation being operable to be brought into contact with said protective coating and a disc advancement mechanism to advance said digital disc from said first workstation to a second and successive workstation.

According to a further aspect of the invention, there is provided a method for reconditioning a protective coating on a compact disc, said method comprising positioning said disc in a first workstation, bringing a first tool into contact with said protective coating for reconditioning said protective coating in a first operation and transferring said compact disc from said first workstation to a subsequent work station when said first tool has completed said first operation.

According to a further aspect of the invention, there is provided a method of reconditioning a plurality of digital discs which have had protective coatings damaged resulting in a misread or a non-read of data on said discs, said method comprising obtaining said digital discs from a source of digital discs, transferring said digital discs from said source to a protective coating reconditioning machine, reconditioning said protective coatings of said digital discs in said reconditioning machine by automatic transfer of said discs between at least two workstations in a reconditioning process to obtain reconditioned discs and returning said reconditioned discs to said source.

BRIEF DESCRIPTION OF THE SEVERAL VIEWS OF THE DRAWINGS

Specific embodiments of the invention will now be described, with the use of drawings, in which.

DESCRIPTION OF SPECIFIC EMBODIMENT

Figure 1:
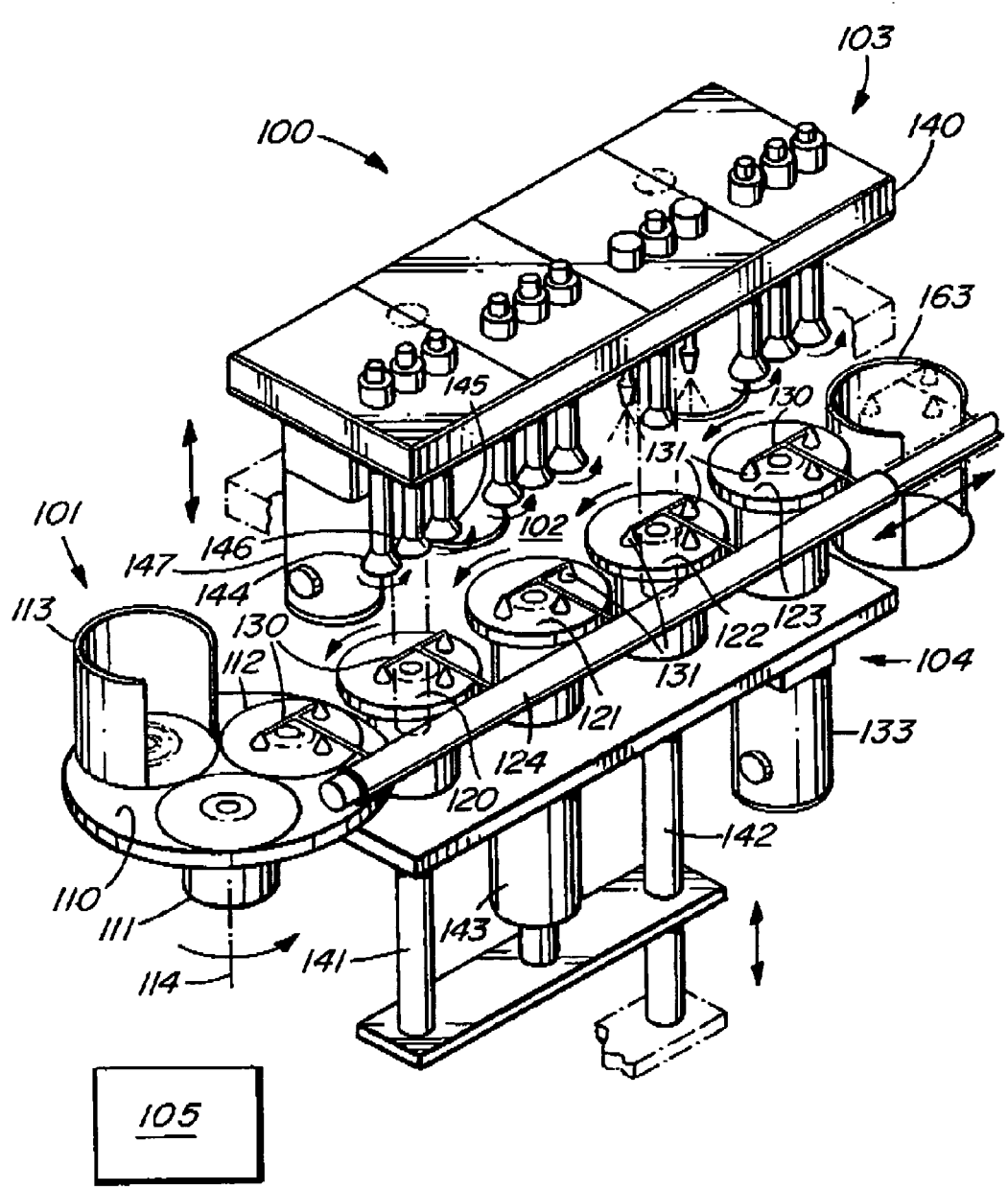
FIG. 1 is a diagrammatic isometric view of the digital disc reconditioning apparatus according to the invention.

Referring now to the drawings, a digital disc reconditioning machine is illustrated generally at 100 in FIG. 1. It comprises four (4) principal operating areas, namely a feed area generally illustrated at 101, a disc reconditioning area generally illustrated at 102, a head and tool area generally illustrated at 103 in the upper area of the reconditioning machine 100 and the motive area generally illustrated at 104 which is located in the lower area of the reconditioning machine 100. A controller 105 is used to properly sequence the various events occurring during the reconditioning process as will be described.

The feed area 101 comprises a turntable 110 which is rotatable by an electric motor 111 which is a DC type motor and which is therefore adjustable to provide various revolution speeds as the operator may desire for the particular operation. Turntable 110 is a plastic composite type turntable with a single circular recess 112 formed therein. The recess 112 is approximately 3/16 inch deep and is the approximate diameter of the digital disc being reconditioned. The recess 112 allows a digital disc to be held during the feed operation as the turntable 110 rotates reciprocally as will be described.

The feed area 101 further includes the digital disc cartridge 113. The digital disc cartridge 113 is intended to hold a plurality of digital discs, conveniently 60 to 100, which digital discs enter the recess 112, one by one, as will be described.

Figure 3:
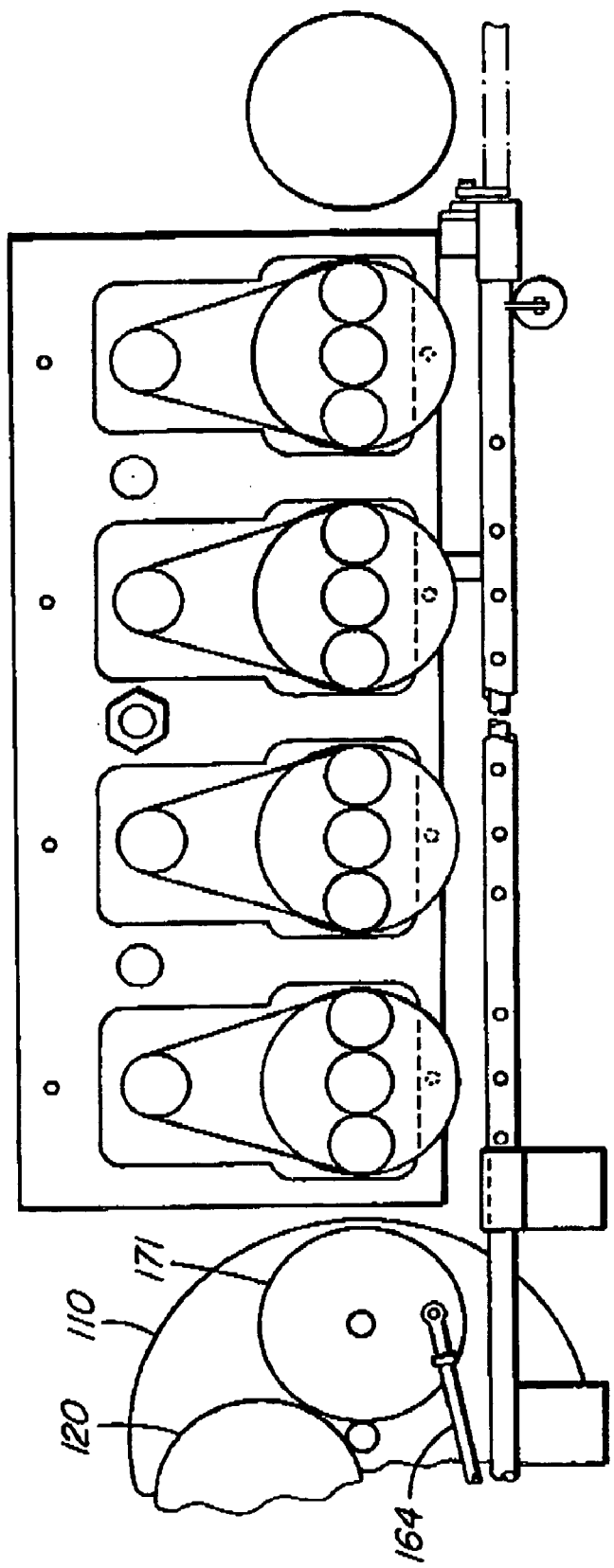
FIG. 3 is a plan view illustrating the work tools and drive belts used at respective successive workstations, the rotatable turntable movable between the disc load and unload positions and the shaft which holds and rotates the suction tools.

The turntable 110 reciprocates about the axis of rotation 114 by use of a bell crank or arm 164 (FIG. 3) between two positions. The first position 170 is the load position. The recess 112 is brought directly beneath the digital disc cartridge 113. The second position 171 is the unload position. This position brings the disc held by recess 112 into position for removal from the recess 112 by the suction tools 130 (FIG. 1) wherein reconditioning commences. The bell crank 164 is operable from motor 11 which moves the turntable 110 between the two working positions 170, 171. The rotational speed of the motor 111, being adjustable, can thereby increase or decrease the speed with which the turntable rotates between the unload and load positions and thereby the speed with which digital discs enter the reconditioning process.

The disc reconditioning area 102 comprises a series, conveniently four (4), workstations. Each workstation is defined by a respective turntable 120, 121, 122, 123. A rotatable and reciprocal hollow shaft 124 allows a plurality of suction tools 130 (see also FIG. 4) conveniently five (5) such tools 130, to simultaneously lift the plurality of digital discs being reconditioned and to move each of the discs to a successive work station. The shaft 124 is hollow thereby to carry a vacuum or negative pressure which is transferred to the suction tools 130.

The suction tools 130 conveniently have three rubber suction heads 131 which are connected to a mounting frame 132. Mounting frame 132 is made from tubing and is connected to shaft 124. The tubing allows the suction within shaft 124 to be transferred to the suction heads 131 used to grasp and move the digital discs. The suction within shaft 124 is conveniently generated by air under pressure being passed through a nozzle which air then passes over a port (not illustrated). A suction is thereby generated within the cavity to which the port is attached, namely the inside of hollow shaft 124.

An electric motor 133 of the DC variety is mounted on the lower frame 134. Electric motor 133 is adjustable and drives the turntables 120, 121, 122, 123 at rotational speeds as desired by the operator.

An upper head 140 is mounted on guide rails 141, 142 and a pneumatic cylinder 143 is operable to raise and lower the upper head 140 with the attached work tools so as to bring the work tools into contact with the plastic overlay of the digital disc. The worktools used are different at each workstation as described hereafter.

The first workstation defined by turntable 120 comprises three worktools 144, 145, 146. Worktools 144, 145 are sanding tools (see also FIG. 4) and conveniently utilise an aluminum oxide or carbide material for contacting and sanding the discs. Each of the sets of tools 144, 145, 146 is rotatable by an individual DC motor 147 (only one of which is shown). Thus, the rotational speed of the worktools at each workstation may be adjusted relative to the rotational speed of the worktools at other workstations. The work tools 144, 145 serve to remove a small amount of material from the plastic overlay on the digital disc and thereby to perform the initial reconditioning operation.

Figure 4:
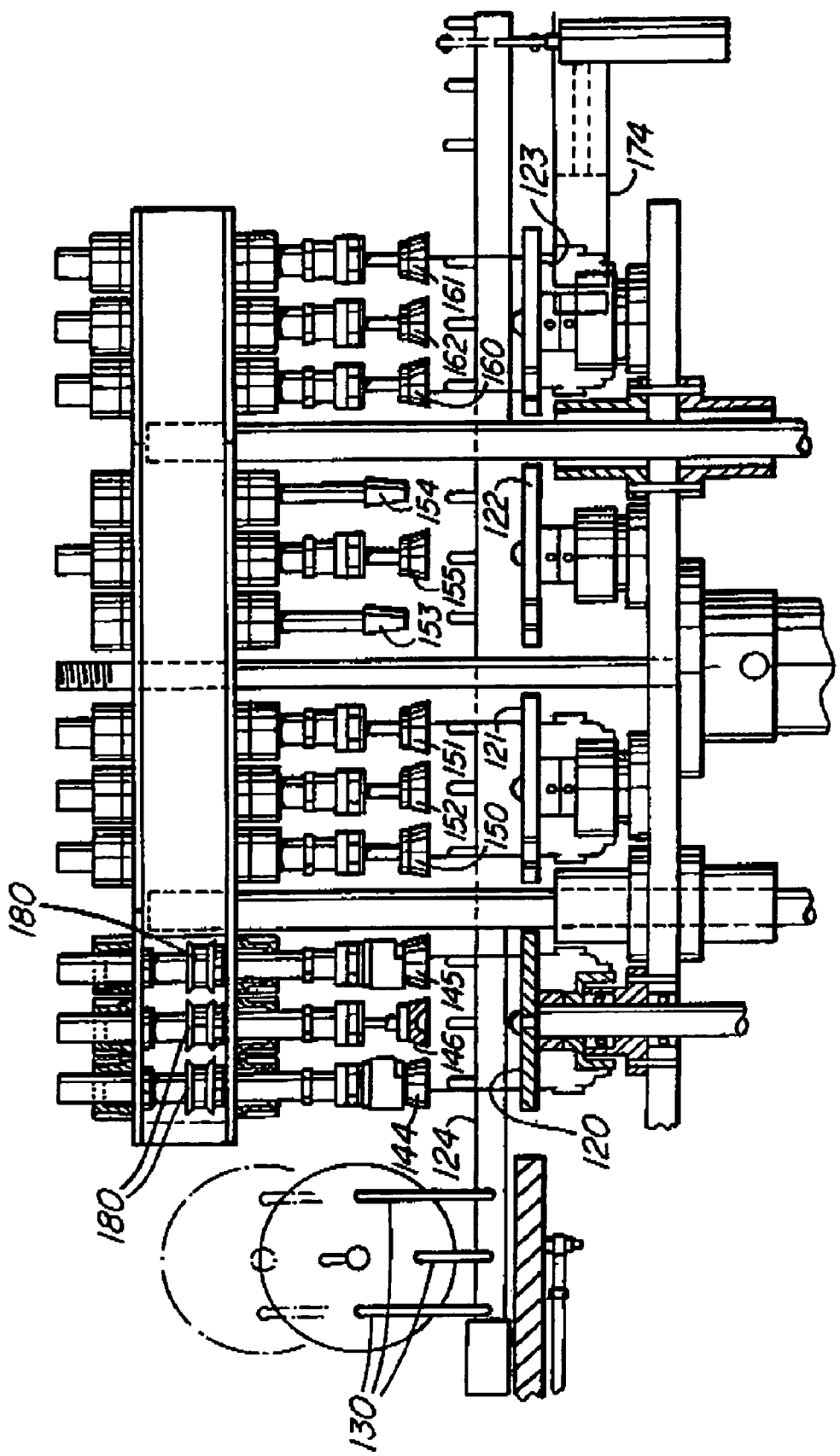
FIG. 4 is a side view of the disc reconditioning machine particularly illustrating the work tools connected to the upper head at successive workstations and the turntables at each workstation according to the invention.

Worktool 146 is a holding member (FIG. 4). Worktool 146 exerts a downwardly directed force on the digital disc on turntable 120 and, as turntable 120 rotates, so likewise will the head of worktool 146. The function of the worktool 146 is to exert sufficient force on the digital disc on turntable 120 to avoid any skipping or other dislocated movement of the digital disc during contact with the sanding worktools 144, 145.

The second workstation defined by turntable 121 likewise comprises three worktools, namely worktools 150, 151, 152 (FIG. 4). Worktools 150, 151 conveniently utilise a material such as a borax powdered material which finely removes a further small amount of material or discontinuities from the overlay of the digital disc which may be present following the material removal at first workstation 120. Worktool 152 of workstation 151 is identical to worktool 146 at the first workstation; that is, the worktool 152 maintains good contact between the digital disc being reconditioned and the turntable 121 and prevents any discontinuous relative movement between the digital disc and the turntable 121 during the material removal operations being conducted upon the overlay of the digital disc.

The third workstation defined by turntable 122 is the rinse and wax workstation with worktools 153, 154, 155. Worktool 154 emits a rinsing solution to remove any material which has been removed from the digital disc at workstations 120, 121 and worktool 155 emits a waxing material to coat the upper surface of the digital disc being reconditioned thereby providing a new protective coating on the digital disc being reconditioned. Worktool 155 is identical to worktools 146, 152 and maintains the digital disc on turntable 122. Worktools 150, 151 do not rotate and do not contact the overlay of the digital disc being reconditioned.

The fourth and final workstation defined by turntable 123 is the polishing workstation. At this workstation, worktools 160, 161 have a buffing material mounted on their heads which buffing material is brought into contact with the digital disc to polish and buff its now reconditioned plastic overlay. Worktool 162 is identical to worktools 146, 152, 155, all of which have been described.

A receiving cartridge 163 is positioned following the workstations 120, 121, 122, 123. Receiving cartridge 163 receives the reconditioned digital discs and stores them until the reconditioned discs are manually removed from the receiving cartridge 163 by the operator.

OPERATION

In operation, a plurality of damaged digital discs will have been received from an operating location or other source such as a video or disc rental outlet. These discs will be stacked and placed within the digital disc feed cartridge 113. The operation of the digital disc reconditioning machine 100 will then commence.

The operation of motor 111 (FIG. 1) which controls the reciprocal and rotatable movement of the turntable 110 will be initiated. Arm 164 (FIG. 3) which is connected between motor 111 and turntable 110 will move the turntable 110 between the load and unload positions 170, 171, respectively. The load position 170, directly under the digital disc cartridge 113, allows only one disc to enter the recess 112 in turntable 110. With the rotation of the turntable 110 to the unload position 171, the remaining ones of the damaged digital discs within cartridge 113 will remain within the cartridge 113.

Figure 2:
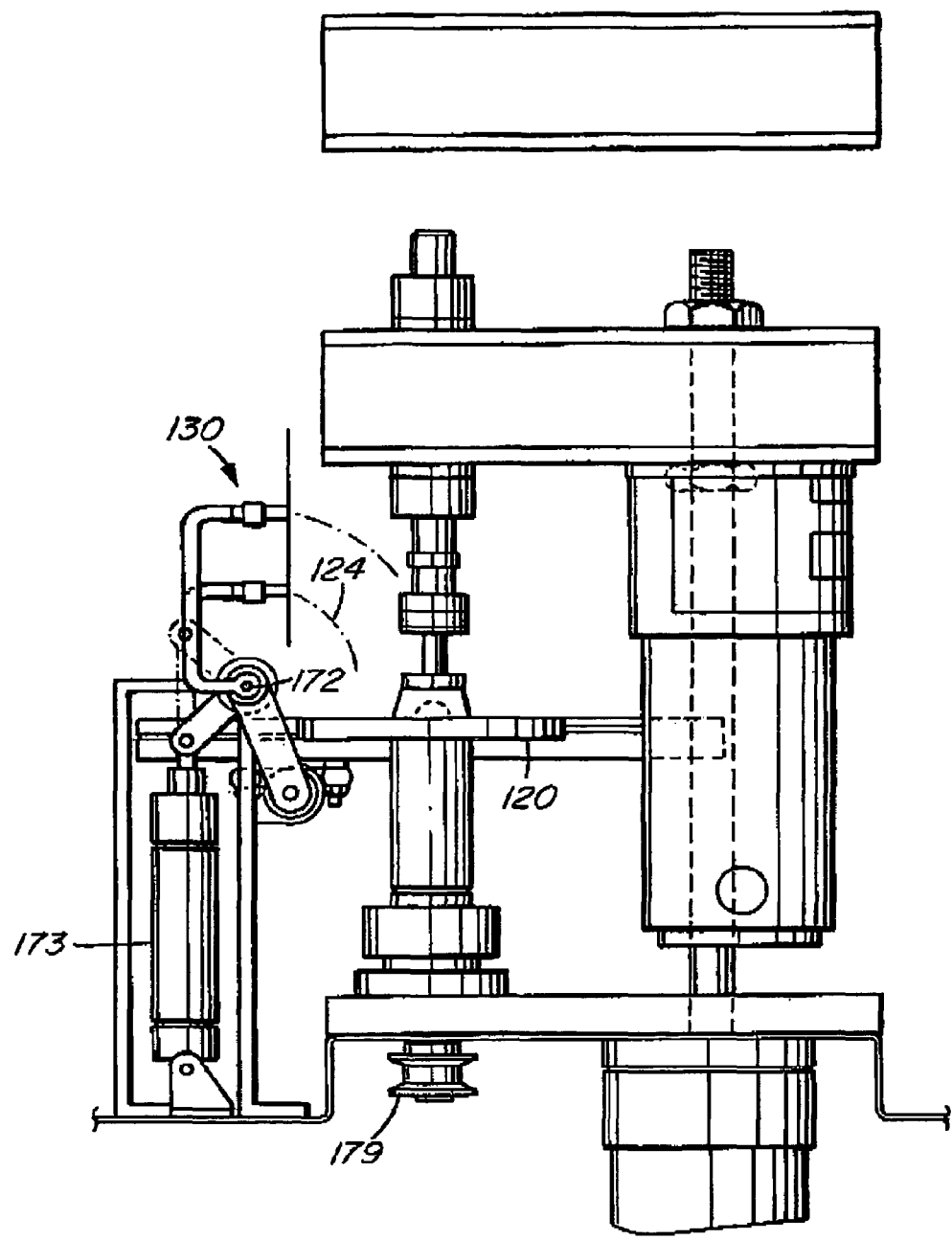
FIG. 2 is a side view of the disc reconditioning apparatus particularly illustrating the bellcrank used to rotate the shaft used for digital disc advancement from work station to workstation.

Following the movement of the disc to the unload station 171, the suction tools 130 (FIG. 4) over the turntable 110 will be brought into contact with the digital disc and the suction within the suction tools 130 will grasp the digital disc on turntable 110. Shaft 124 will be rotated counter-clockwise about axis 172 by pneumatic cylinder 173 (FIG. 2) and the suction tools 130, being fixedly mounted on shaft 124 as best seen in FIG. 4, will likewise rotate upwardly about axis 172 with shaft 124 or clockwise as viewed in FIG. 2. The digital disc, thereafter, will assume a vertical orientation ninety (90) degrees removed from the horizontal position where the digital disc is initially grasped by the suction tools 130 as illustrated in FIG. 2.

The shaft 124 is then moved rightwardly as viewed in FIGS. 1 and 4 by contraction of pneumatic cylinder 174 (FIG. 4) until the digital disc is positioned vertically besides turntable 120 which defines the first workstation. The shaft 124 is rotated clockwise as viewed in FIG. 2 by pneumatic cylinder 173 and the suction tools 130 will position the digital disc directly on turntable 120 with the suction tools assuming a generally horizontal position. The suction within suction tools 130 will be terminated and the digital disc will rest on turntable 120. The shaft 124 and attached suction tools 130 will thereafter be rotated upwardly with the suction tools 130 again assuming a generally vertical position approximately ninety (90) degrees removed from the position wherein the digital disc was deposited on the turntable 120. The shaft 124 will subsequently move leftwardly as viewed in FIGS. 1 and 4 under the influence of pneumatic cylinder 174 until the suction tools 130 are directly over turntable 110 thereby being in a position to retrieve a second disc from the unload position 171 on turntable 110.

Following the deposit of the digital disc on turntable 120, motor 133 initiates operation in order to rotate the turntables 120, 121, 122, 123 by rotation of pulleys 179 (FIG. 2), only one of which is illustrated, which are belt connected with motor 133. At substantially the same time, the operation of the pneumatic cylinder 143 is initiated such that the cylinder 143 is contracted and thereby lowers the upper head 140 on guide rails 141, 142 with the attached worktools 144, 145, 146. The worktools 144, 145, 146 are rotated with the use of pulleys 180 (FIG. 4) driven by a first upper workstation motor 147 (FIG. 1). Each set of worktools at each workstation has an individual motor which is used to drive the worktools at separate stations at speeds which are varied according to the worktool application.

While the sanding operation occurs between the worktools 144, 145 and the digital disc on turntable 120, worktool 146 will maintain the digital disc in contact with the turntable 120. The head of worktool 146 which is contacting the disc will rotate with the disc thereby preventing any relative movement between the disc and the turntable 120 during the sanding operation.

Following the completion of the sanding operation, the pneumatic cylinder 143 is extended thereby raising the upper head 140 and removing the worktools 144, 145, 146 from contact with the digital disc on turntable 120. The shaft 124 will be rotated until the suction tools 130 are in proximity with the digital disc on turntable 120. It will be noted that the first set of suction tools 130 as located most leftwardly in FIG. 1 will simultaneously be in proximity with a second digital disc within recess 112 on turntable 110.

The suction within suction tools 130 is activated and the suction tools grasp the sanded disc on turntable 120 while simultaneously grasping a further disc on turntable 110. Thus, at this point, two digital discs are being held by suction tools 130. Shaft 124 is again rotated counterclockwise as viewed in FIG. 2 until each of the two discs assumes a vertical position as shown and being removed from turntables 110, 120. Shaft 124 is reciprocated by pneumatic cylinder 174 (FIG. 4) thereby to move the first digital disc to a position adjacent to turntable 121 for fine material removal and to move the second digital disc obtained from turntable 110 to a position adjacent turntable 120 for the aforementioned sanding or rough material operation.

The process continues until there are digital discs present on all of the five (5) turntables 110, 120, 121, 122, 123, simultaneously.

Following the final polishing or buffing operation at the fourth workstation defined by turntable 123, the reconditioned digital disc is moved again by the reciprocal movement of shaft 124 until the suction tools 130 shown in phantom in FIG. 1 are directly above the receiving cartridge 163. When the suction is terminated, the reconditioned disc is dropped by the suction tools directly into the receiving cartridge 163 for manual retrieval with others of the reconditioned discs on which operations have been conducted.

There are three (3) independently operated motors at the workstations defined by turntables 120, 121 and 123. This is so because it may be necessary to adjust the rotational speed of the worktools at each of these locations so as to differ from the rotational speed of the worktools at the remaining locations caused by the different operations taking place at each of the workstations. At the workstation defined by turntable 122, no rotational movement of the worktools is necessary since two of the worktools emit a rinse and wax solution, respectively, and the third one of the worktools 155 (FIG. 4) has a head which rotates with the turntable 122.

The sequence of events and the initiation of the suction, shaft rotation, shaft reciprocity, motor commencement, etc. are all controlled by a programmable controller 105. Thus, the events may be initiated or terminated relative to the remaining events so as to provide efficient operation and unwasted motion during the reconditioning operation.

Many modifications will readily occur to those skilled in the art to which the invention relates. The operation of the turntable on which the digital discs are deposited from the cartridge 113, although being reciprocated between the load and unload positions as described, may be rotatable with two discs being positioned on the turntable 110 as illustrated in FIG. 1. Other modifications would include the use of hydraulic cylinders rather than pneumatic cylinders and, likewise, controlling components being operable with various components being used.

Many further modifications will readily occur to those skilled in the art to which the invention relates and the particular embodiments described herein should be taken as illustrative of the invention only and not as limiting its scope which should be construed in accordance with the accompanying claims.

I claim:

1. An automated method for reconditioning a plurality of digital discs, each of said digital discs comprising data underlying a protective coating, said method comprising;
   holding said digital discs to be reconditioned in a feed area;
   transferring each of said digital discs from said feed area to a first workstation with a disc transfer mechanism;
   contacting each of said digital discs transferred to said first workstation with at least one worktool operable to at least partially recondition said protective coating of each of said digital discs;
   transferring each of said digital discs from said first workstation to a plurality of successive workstations with said disc transfer mechanism; and at each of said successive workstations, contacting each of said digital discs with at least one worktool operable to at least partially recondition said protective coating of each of said digital discs.

2. The method of claim 1, wherein said digital discs are reconditioned without manual manipulation of said digital discs.

3. The method of claim 1, further comprising transferring each of said digital discs from said workstation to a receiving cartridge with said disc transfer mechanism.

4. The method of claim 1, wherein said transferring and contacting steps are controlled by a controller.

5. The method of claim 1, wherein said contacting step comprises moving said worktool into contact with each of said digital discs.

6. The method of claim 1, wherein said feed area comprises a feed cartridge.

7. The method of claim 6, wherein said feed area further comprises a turntable that is rotatable between a load position wherein each of said digital discs is deposited onto said turntable and an unload position wherein each of said digital discs is removed from said turntable for transfer to said workstation.

8. The method of claim 1, wherein said disc advancement mechanism comprises at least one suction tool operable to grasp each of said digital discs from said feed area and deposit each of said digital discs at said workstation.

9. The method of claim 1, wherein said transferring step comprises depositing each of said digital discs on a turntable of said workstation.

10. The method of claim 9, further comprising rotating said turntable and said worktool during said contacting step.

11. The method of claim 1, wherein said worktool is operable to remove a portion of said protective coating of each of said digital discs without removal of said data underlying said protective coating.

12. The method of claim 1, wherein each of said worktools is operable to perform at least one reconditioning task selected from the following group: remove a portion of said protective coating of each of said digital discs without removal of said data underlying said protective coating; wax said protective coating of each of said digital discs; and polish said protective coating of each of said digital discs.

13. An automated method for reconditioning a digital disc placed within a reconditioning apparatus, said digital disc comprising data underlying a protective coating, said method comprising:
    contacting said digital disc with at least a first worktool operable to remove a portion of said protective coating of said digital disc without removal of said data underlying said protective coating;
    contacting said digital disc with at least a second worktool operable to polish said protective coating of said digital disc;
    wherein said digital disc is supported by a turntable during each of said contacting steps; and
    wherein said contacting steps are performed without manual manipulation of said digital disc to thereby provide automated reconditioning of said digital disc within said reconditioning apparatus.

14. The method of claim 13, wherein said contacting steps are controlled by a controller.

15. The method of claim 13, wherein said contacting steps comprise successively moving said first and second worktools into contact with said digital disc.

16. The method of claim 15, wherein said first and second worktools are vertically moveable relative to said digital disc.

17. The method of claim 13, further comprising contacting said digital disc with at least a third worktool operable to wax said protective coating of said digital disc.

18. The method of claim 13, further comprising rotating said turntable and said first and second worktools during each of said contacting steps.

19. An automated method for reconditioning a digital disc placed within a reconditioning apparatus, said digital disc comprising data underlying a protective coating, said method comprising:
    contacting said digital disc with at least a first worktool operable to remove a portion of said protective coating of said digital disc without removal of said data underlying said protective coating, wherein said first worktool is vertically moveable relative to said digital disc;
    contacting said digital disc with at least a second worktool operable to polish said protective coating of said digital disc, wherein said second worktool is vertically moveable relative to said digital disc; and
    wherein said contacting steps comprise successively moving said first and second worktools into contact with said digital disc and are performed without manual manipulation of said digital disc to thereby provide automated reconditioning of said digital disc within said reconditioning apparatus.

20. An automated method for reconditioning a digital disc placed within a reconditioning apparatus, said digital disc comprising data underlying a protective coating, said method comprising:
    contacting said digital disc with at least a first worktool operable to remove a portion of said protective coating of said digital disc without removal of said data underlying said protective coating;
    contacting said digital disc with at least a second worktool operable to polish said protective coating of said digital disc;
    contacting said digital disc with at least a third worktool operable to wax said protective coating of said digital disc; and
    wherein said contacting steps are performed without manual manipulation of said digital disc to thereby provide automated reconditioning of said digital disc within said reconditioning apparatus.

* * * * *